United States Patent [19]
Schadt et al.

[11] Patent Number: 5,602,661
[45] Date of Patent: Feb. 11, 1997

[54] OPTICAL COMPONENT

[75] Inventors: Martin Schadt, Seltisberg, Switzerland; Klaus Schmitt, Lörrach, Germany

[73] Assignee: Hoffmann-La Roche Inc., Nutley, N.J.

[21] Appl. No.: 194,234

[22] Filed: Feb. 10, 1994

[30] Foreign Application Priority Data

Feb. 17, 1993 [CH] Switzerland .................. 488/93

[51] Int. Cl.[6] ............... G02F 1/1337; G02F 1/137
[52] U.S. Cl. ............... 349/124; 349/117; 349/167; 349/182
[58] Field of Search ................ 359/75, 76, 73, 359/99, 103, 105; 522/2, 150; 428/1; 430/270, 290

[56] References Cited

U.S. PATENT DOCUMENTS

| | | | |
|---|---|---|---|
| 4,974,941 | 12/1990 | Gibbons et al. | 359/46 |
| 5,262,882 | 11/1993 | Hikmet | 359/75 |
| 5,389,698 | 2/1995 | Chigrinov et al. | 522/2 |
| 5,427,828 | 6/1995 | Park | 428/1 |
| 5,434,687 | 7/1995 | Kawata et al. | 359/78 |

FOREIGN PATENT DOCUMENTS

| | | |
|---|---|---|
| 331233 | 2/1989 | European Pat. Off. . |
| 387059 | 9/1990 | European Pat. Off. . |
| 423881 | 4/1991 | European Pat. Off. . |
| 525478 | 2/1993 | European Pat. Off. . |
| 525477 | 2/1993 | European Pat. Off. . |

OTHER PUBLICATIONS

Schadt, M., et al., *Japanese Journal of Applied Physics*, vol. 31, Part 1, No. 7, pp. 2155–2164 (Jul. 1992).

*Primary Examiner*—William L. Sikes
*Assistant Examiner*—Kenneth Parker
*Attorney, Agent, or Firm*—George W. Johnston; Dennis P. Tramaloni; Alan P. Kass

[57] ABSTRACT

An optical component includes an anisotropic layer of cross-linked liquid crystal monomers with varying local orientation of the liquid crystal molecules. The liquid crystal layer is in contact with an orientation layer comprising a photo-orientable polymer network (PPN). A method of making includes orienting the liquid crystal monomers by the interaction with the PPN layer and subsequently fixing the molecules by cross-linking.

19 Claims, 5 Drawing Sheets

OPTICAL COMPONENT

The invention relates to an optical component comprising an anisotropic film of cross-linked liquid crystal monomers with varying local orientation of the liquid crystal molecules. The invention also relates to preparation of these components.

Anisotropic transparent or colored polymer network layers with a three-dimensional orientation of the optical axis which can be preset at different points are of great importance in display technology and integrated optics.

In principle, this property is possessed by substances known for some years, that is, certain cross-linkable liquid crystal diacrylates and diepoxides. These substances in monomer form, that is, before cross-linking, can be oriented in cells using conventional orientation layers or under the action of external fields, for example, magnetic or electric fields, in the liquid crystal (LC) phase and can be photo cross-linked in a second step without losing the orientation impressed in the monomeric state.

Layer structures of this kind are known for example, from EP-A-331 233. They are prepared by orienting a monomer layer in an external field and then irradiating a part of it through a mask. Cross-linking is triggered in the irradiated region only. The direction of the external field is then changed and the remaining non-cross-linked monomer regions are re-oriented with reference to the new direction of the field. The latter region is then also cross-linked by illumination. Clearly, this method cannot result in an orientation structure with high local resolution, since the radical cross-linking reaction is not sharply bounded because of the shading of the mask.

Orientation layers are of critical importance in the construction of liquid crystal display cells. They determine the orientation of the liquid crystal material in the cell, that is, the position of the optical axis, and thus substantially determine the possibility of manufacturing liquid crystal cells, for example, twisted nematic or "TN" or super-twisted nematic or "STN" cells. Normally, these orientation layers consist of suitably ground polyimide or PVA layers or obliquely vapor-deposited SiOx layers. The methods of producing these layers substantially provide only uniform orientations over macroscopic areas. In many possible applications, however, it is desirable to vary the orientation of the LC layer arbitrarily, for example, periodically, in microscopic regions also.

Some recently-known methods can produce orientation layers with locally variable orientation properties. For example, U.S. Pat. No. 4,974,941 describes orientation by photolithographic methods of dichroic dye molecules incorporated in the polymer. This method produces a thermally unstable orientation of the chromophores and is therefore unsuitable for orienting the cross-linkable liquid crystals used in the present case.

The aim of the invention is to provide improved layer structures of the aforementioned kind for optical and electro-optical components.

According to the invention, the aim is achieved by an orientation layer comprising a photo-orientable polymer network (PPN) which is in contact with the liquid crystal layer. According to the invention, the layer structure is prepared in that the liquid crystal monomers are oriented by interaction with the PPN layer and the orientation is fixed in a subsequent cross-linking step.

The orientation layers consist of photo-orientable polymer network layers (PPN) which, when selectively irradiated with polarized UV light, induce high-resolution orientation patterns on LC layers. The substances in question are for example, cinnamic acid derivatives as described in Swiss Patent Applications 2244/91, filed as U.S. patent application Ser. No. 07/910,068, filed Jul. 8, 1992, abandoned and now as Ser. No. 08/125,006, U.S. Pat. No. 5,389,698 filed Sep. 21, 1993, the contents of which are hereby incorporated by reference, and 2246/91, filed as U.S. patent application Ser. No. 07/910,066, filed Jul. 8, 1992, abandoned and pending now as Ser. No. 08/125,005, filed Sep. 21, 1993, the contents of which are hereby incorporated by reference. The orientation process is based on photo-induced orientation and dimerization of the polymer side-chains. In the present case, in contrast to the method described in U.S. Pat. No. 4,974,941, the orientation pattern is stabilized by the dimerization reaction, which converts the polymer layer into an oriented polymer network. There is also a drastic reduction in the solubility of the polymer layer.

It is surprising that these PPN polymers can also be used to give certain cross-linkable LC monomer layers a structured orientation and can also cross-link them so as to preserve the orientation. PPNs with a high glass point have been found to be particularly suitable, for example:

1) PPN1
$T_g = 156°$ C.

2) PPN2
$T_g = 133°$ C.

3) PPN3
$T_g = 105°$ C.

and LC monomer layers consisting of diacrylate components, such as, for example,

1) LC1

2) LC2

3) LC3 and mixtures thereof.

The combination of PPN and cross-linkable LC monomers according to the invention will hereinafter also be referred to as a hybrid layer. For the first time it provides a means of transferring the optically inscribed high resolution orientation structure of a thin polymer layer to a double-refractive tightly cross-linked polymer layer of arbitrary thickness. The following are some useful properties of these hybrid layers: they are insoluble in many solvents, particularly low-molecular LC, they are thermally stable, their optical anisotropy is practically independent of temperature, the optical anisotropy can have high values of n>0.2 and the local resolution of the orientation structure is determined by the PPN, that is, is in the submicronic region.

A number of known optical components can be prepared by a new method by photolithographically structured PPN coating in co-operation with very anisotropic liquid crystal network layers which can be oriented with sharp edges. In addition, novel optical components are possible for the first time.

For example, lamellar wave guide structures, structured retarding plates, polarizing beam-splitters etc. can be prepared in cells by using double refraction. Another possibility is to fix TN structures by cross-linking, thus producing polarization rotators. These can extend over the entire cell surface or can be limited to very small areas. Chessboard structures are important where adjacent compartments about the size of a pixel either rotate the polarization of light by for example, 90° or do not influence it. This is a method of producing three-dimensional TV liquid crystal screens, as already described in Swiss Patent Application 2245/91, filed as U.S. patent application Ser. No. 08/910,067, filed Jul. 8, 1992, abandoned and now pending as Ser. No. 08/121,093, filed Sep. 14, 1993, the contents of which are hereby incorporated by reference.

Another application is to 3D transparencies for line graphics. In this case, the two substrates coated with PPN are first irradiated with linear-polarized UV light and then, in a second illumination step, the two component images for the right and the left eye, respectively, are inscribed in one of the PPN layers by linear-polarized UV light having a direction of polarization which has been rotated +45° or −45° relative to the first irradiation. A liquid crystal cell is constructed from these substrates and filled with cross-linkable LC monomers according to the invention. The structure induced by the PPN orientation layers is fixed by cross-linking. The result is an optical structure in which linear-polarized light polarized parallel or at right angles to the direction of polarization of the first irradiation is transmitted unchanged outside the image contours, whereas it is rotated through +45° by the contour of one component image and −45° by the contour of the other component image. As a result, when the cell is viewed through suitable polarization glasses, the two component pictures are received by the right and left eye separately, resulting in 3D effects.

As described in the Examples, the structured cross-linked layer can be given the form of a coating on a substrate. This is done by spin-coating the cross-linkable LC monomers on substrates coated with PPN or by preparing the cross-linked layer in a cell and subsequently separating a substrate.

A coating of this kind can serve for example, as an orientation layer for LCDs (Liquid Crystal Displays), thus combining the orientation and double-refraction properties in a very small space. Two embodiments are possible.

Either the oriented anisotropic network coating itself induces an orientation on the adjacent LC layer. In this case, the orientation pattern of the LC layer and the double-refraction pattern of the network layer are correlated. Alternatively, an orientation direction independent of the structure of the network coating is impressed on the oriented network coating by grinding, as in a conventional orientation layer. In this case, the optical properties of the LC layer will be independent of the network coating.

An additional layer can be deposited on the oriented network coating. For example, a transparent conductive layer (ITO) can be applied by sputtering without damaging the network coating. These possibilities are of great importance for display technology. More particularly, retarding layers of the kind necessary in STN displays can be incorporated in the display.

According to another feature of the invention, dichroic dyes are mixed with the cross-linkable monomers and aligned parallel to the monomers when oriented. This is a means of constructing locally-structured dichroic filters and dichroic polarizers. Structured dichroic beam-splitters are a special application. Dichroic dye molecules are particularly suitable when they have a functional group enabling the dye to be incorporated in the network, for example, dyes comprising an acrylate head group, which are incorporated into the network of LC diacrylates.

Alternatively, chiral molecules can be mixed with the cross-linkage monomers or functionalized chiral molecules can be incorporated in the network. The chiral molecules and concentration thereof can be chosen so as to induce helical structures serving as cholesteric filters or optical retarders.

According to another feature of the invention, functionalized LC molecules with a strong permanent axial or lateral dipole moment are mixed with the cross-linkable LC monomers. By this means, the orienting effect of the PPN layer can be intensified or otherwise influenced by an external electric field. This opens the possibility, inter alia, of acting via the layer thickness so as to convert the director orientation of the LC layer from a homogeneous orientation at one boundary layer to a homoeotropic orientation at the other boundary layer.

In one particularly important application, the layer thickness and/or the direction and strength of the external magnetic or electric field are chosen so as to produce orientation layers having a preset tilting angle, as required in LC displays.

EXAMPLE 1

A 1% PPN1 solution in NMP was spin-coated on two glass plates coated with ITO. Spin parameters: 4000 rpm. Two hours pre-drying at 130° C. on a heat bench was followed by 4 hours at 180° C. in vacuo.

The two coated plates were irradiated with linear polarized light from a 400 W Hg very high-pressure lamp for half an hour at 25° C. Next, an LC cell 10μ thick was made from the substrates, the plates being disposed so that they were oriented at right angles to one another relative to the direction of polarization of the irradiation.

The cell was filled with cross-linkable LC1 at 140° C. and cooled to the nematic phase at 95° C.

The nematic layer was oriented in the cell and took up a TN configuration, as preset by the preparation of the orientation layers. The oriented layer was exposed to the unpolarized light from a 100 W Hg very high-pressure lamp at 90° C. for a few minutes, thus cross-linking the LC layer while retaining the TN configuration. In this manner the structure of the cell was fixed and remained unchanged on cooling to room temperature.

EXAMPLE 2

An LC cell was constructed as in Example 1, but in the present Example only one of the substrates was coated with PPN. The second substrate had a conventional orientation layer of ground polyimide. In this case also a TN cell was obtained when the direction of grinding the polyamide layer was oriented parallel to the polarization direction of the UV light used for irradiating the PPN substrate.

EXAMPLE 3

As in Example 1, glass plates coated with PPN1 were irradiated with linear-polarized UV light. Next, one of the plates was irradiated a second time through a chromium mask with linear polarized UV light, but with the direction of polarization rotated through 90°. The plates were used to make an LC cell, filled with cross-linkable LC1 as in Example 1, and cross-linked. The result was a TN configuration as in Example 1 in those areas of the layer which had been illuminated only once, and a parallel configuration in the doubly-illuminated areas. The two areas were delineated from one another by sharp edges.

EXAMPLE 4

A three-dimensional-transparency:

As in Example 2, the two substrates coated with PPN1 were irradiated with linear-polarized light and then, in a second and third illumination step, the two component images of the 3d linear object, containing the information for the right and left eye respectively, were inscribed on to one of the two substrates. To this end, in the second illumination step, one component image was irradiated through a mask with UV light polarized in a direction rotated by +45° relative to the first irradiation, whereas in the third illumination step the second component image was inscribed with polarization rotated through −45°, through an additional mask having the contour of the second component image. Next, an LC cell was constructed from the two substrates and filled with cross-linkable LC monomers according to the invention.

The structure induced by the PPN1 orientation layers was fixed by cross-linking. The result was an optical structure in which linear polarized light polarized parallel or at right angles to the direction of polarization of the first irradiation was transmitted unchanged outside the image contours, but was rotated through +45° in the region of the contour of one component image and through −45° in the region of the other component image. A three-dimensional impression was obtained by viewing a cell of this kind through suitable polarization glasses.

In this case as in Example 2, the second, unstructured substrate could be provided with a conventional orientation layer.

EXAMPLE 5

As in Example 1, a PPN1 coating was spin-coated on to a substrate plate, dried and irradiated with linear-polarized UV light. Next, a mixture of cross-linkable LC monomers and photo-initiator dissolved in NMP (N-methylpyrrolidono) was spin-coated on the first-mentioned coating and dried on a heat bench in the dark at 140° C. The temperature was lowered to 90° so that the LC layer was in the nematic phase. The layer was irradiated with UV light through a window with exclusion of oxygen and cross-linked. The cross-linked layer was oriented corresponding to the PPN1 layer underneath.

Other embodiments of the invention will now be described with reference to the accompanying drawings, in which.

Photo-induced orientation and cross-linking of LC monomers is a means of producing transparent anisotropic polymer coatings with a defined optical path difference $\delta = \Delta n \cdot d$ where $\Delta n = (n_e - n_o)$ is the anisotropy of the layer ($n_e$=extraordinary refractive index, $n_o$=extraordinary refractive index), and d is the thickness of the layer. The optical path difference is determined by the layer thickness and can take values in the range $0 < d < 400$ nm. Also, the direction of the optical axis of the layer is determined by the direction of polarization used when orienting the PPN. The direction of vibration can vary over the range 0°–180°.

Figure 1:
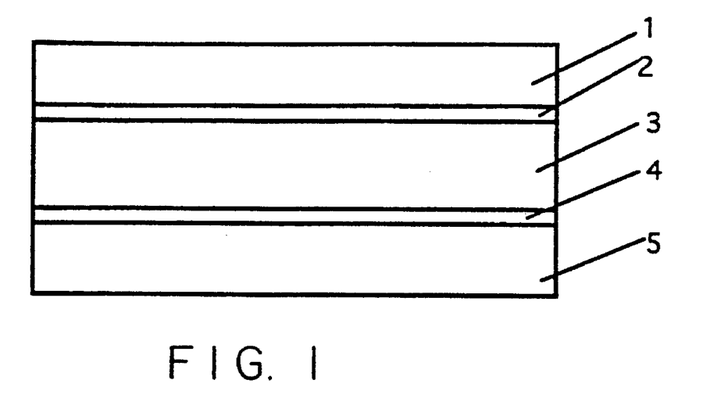
FIG. 1 is a diagrammatic section through a retarder cell.

FIG. 1 shows a diagrammatic section through a retarder cell comprising two spaced-apart substrates 1 and 5, for example, glass plates, the facing surfaces of which bear PPN layers 2 and 4. An LC network 3 is disposed between the plates.

Figure 2A:
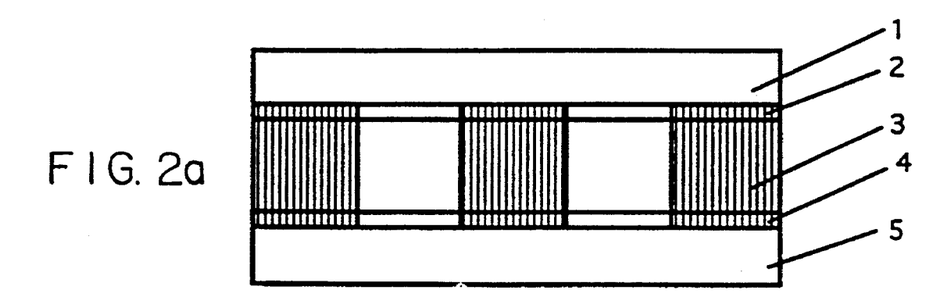
FIG. 2a is a section view and FIG. 2b is a plan view of a structured retarder cell.

FIG. 2a shows a structured retarder cell having a similar construction, as before with two substrates 1 and 5, but their facing surfaces have structured PPN layers 2 and 4, with an LC network 3 in between as before.

Figure 2B:
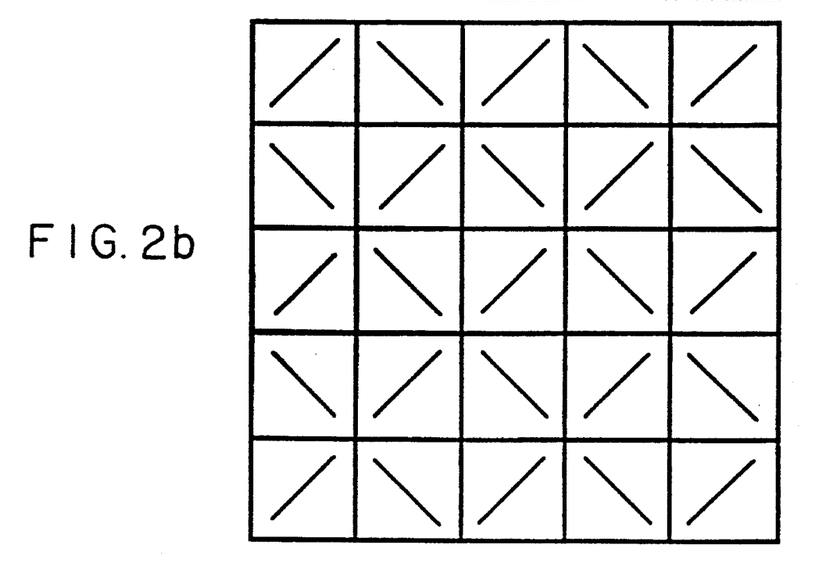

The structuring is shown in the plan view FIG. 2b.

The lines show the direction of the optical axis of the retarder layer.

The possibility of constructing patterns or large-area optical retarder layers by the aforementioned methods and materials, opens a number of possibilities of producing novel liquid crystal displays. The novel liquid crystal displays can be operated either in transmission or in reflection. The electro-optical effects can in principle be all known field effects, inter alia the twisted nematic effect (TN-LCDs), super-twisted nematic effects (STN-LCDs), deformation of restored phases (DAP-LCDs) or the following ferroelectric field effects: Surface-Stabilized-Ferroelectric (SSF) effect, Deformed Helical Ferroelectric (DHF) effect and Short-Pitch Bistable Ferroelectric (SBF) effect.

Figure 3:
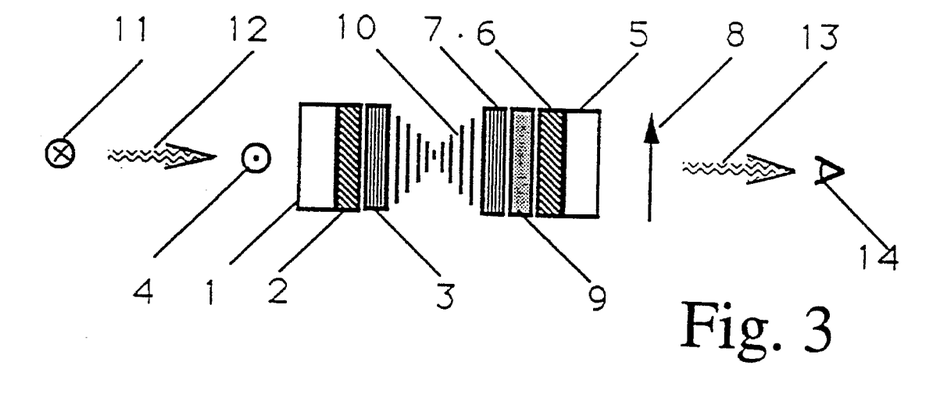
FIG. 3 is a diagram of a color-compensated STN liquid crystal display.

FIG. 3 diagrammatically shows a STN cell comprising two glass plates 1, 5 coated with actuating electrodes 2 and 6. The electrodes are usually segmented, for example, in a display cell. The electrode layer 2 on the plate 1 shown to the left in the drawing is covered as usual with an orientation layer 3, by means of which the adjacent molecules of the liquid crystal 10 between the plates are aligned in a preferred direction.

On the right plate 5, the surface facing the liquid crystal has an aforementioned orientation layer 7. Between it and the electrode layer 6, however, there is also an intermediate layer 9 in the form of a hybrid layer comprising a PPN layer oriented by irradiation with linear-polarized light and optionally so structured, in combination with and covered by a photo-cross-linked LC layer which in the state before cross-linking was oriented by contact with the PPN layer.

The hybrid layer is anisotropic and therefore suitable in known manner as a retarder layer for color compensation of STN cells. The present hybrid layer is particularly advantageous in that its anisotropic properties can be influenced within wide limits by the manufacturing conditions during irradiation with UV light. In this manner the optical path difference of the layer 9 and the direction of the main axis of the double refraction ellipsoid n can be formed in the exact manner to obtain optimum color compensation.

Instead of being uniform, the layer 9 can be structured, that is, its optical properties can be different in different regions. In this manner, for example, regions having color compensation, that is, black-white contrast, can alternate with regions which are not compensated, that is, colored. Instead of a hybrid layer 9 on one plate, retarder layers of the aforementioned kind can be provided on both plates. This is important when liquid crystals operate in reflection.

The hybrid retarder layer 9 may also be disposed between the glass plate 1 and the electrode layer 2. This is particularly advantageous when the thickness of the retarder layer 9 has no electrical effect, that is, when application of a voltage to the electrodes will not result in a voltage drop across the layer 9.

The hybrid retarder layer 9 can also be applied to the outer surface of one or both substrates 1 and 5. The orientation layers 3, 7 can be given their orientation effect in conventional manner by oblique vapor-deposition or by grinding. Alternatively, PPN layers can be used for the orientation layers.

The liquid crystal display cell shown in FIG. 3 is supplemented by a linear input polarizer 4 and a linear output polarizer 8 at right angles thereto. Alternatively the linear polarizers can be replaced by circular polarizers in known manner.

Unpolarized light 12 coming from a source 11 is linear-polarized by the polarizer 4 in the direction at right angles to the plane of the drawing and, on transit through the liquid crystal in the switched-off state as shown, is split up and partly rotated and thus converted into elliptically polarized light. Without the layer 9, the light would be colored, owing to the variations in transit time through the liquid crystal 10 depending on the wavelength. The layer 9 produces color compensation in known manner, resulting in a black-white contrast between the switched-on and the switched-off state. The part 13 of the light vibrating parallel to the direction of polarization of the output polarizer 8 is transmitted to the observer 14. In the switched-on state when the STN cell is operated in positive contrast mode, the liquid crystal 10 becomes optically uniaxial for transmitted light, so that the linear polarization remains and the output polarizer 8 blocks the light. The observer 14 sees no light.

Instead of choosing the optical path difference and the position of the double-refraction ellipsoid of the optical retarder layer so as to compensate the inherent color of STN display cells, the same quantities can be chosen in conjunction with the polarizer positions, so as to produce colors by using the cell in FIG. 3.

In the case both of optically bistable field effects and field effects involving grey stages, it is known to produce colors by using the properties underlying the effects (wave-guiding, double refraction), using suitable polarizer positions. These interference colors can be influenced by one or more additional retarder layers. Different adjacent color areas can be obtained by means of the aforementioned possibility of structuring the retarder layer with regard to its optical properties, that is, patterns with various pitch differences and the double-refraction ellipsoid positioned in different surface regions.

Figure 4:
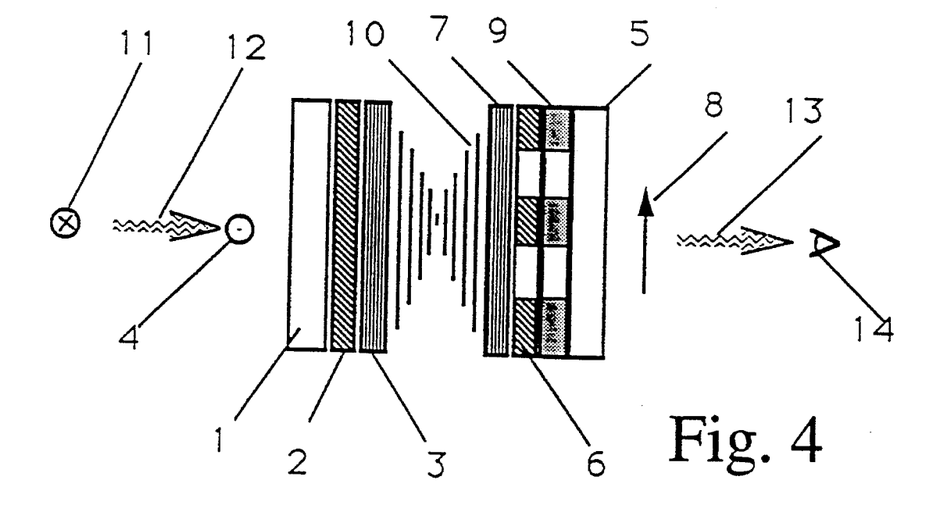
FIG. 4 is a diagram of a liquid crystal cell for color display.
Figure 5:
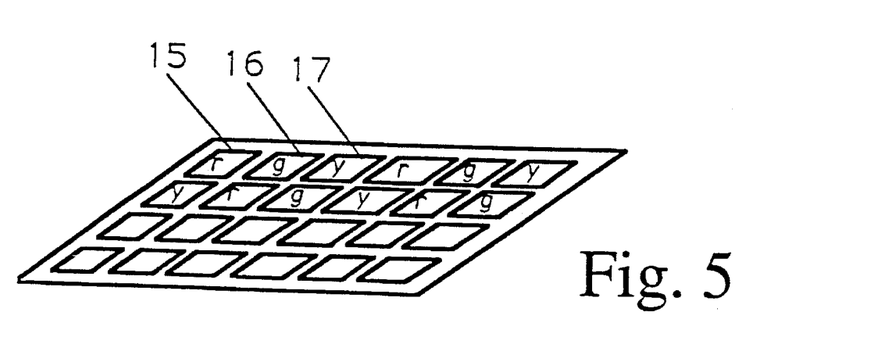
FIG. 5 shows a color grid on the cell in FIG. 4.

FIGS. 4 and 5 diagrammatically show an example of a color display comprising differently-colored pixels disposed side by side in a regular pattern.

FIG. 4 is a diagrammatic section through a display cell having substantially the same construction as the cell in FIG. 3. In contrast to FIG. 3, the retarder layer 9 and the electrode layer 6 are interchanged. Also, these two layers are divided into individual areas in a pattern. FIG. 5 is a plan view of the electrode layer 6 and the retarder layer 9, with pixels disposed in lines and columns.

In order to display color, the retarder layer is constructed for example, so that red appears in the region of the left upper pixel 15, green in the region of the adjacent right pixel 16, yellow in the region of the next pixel 17, followed by red again. In the next line, the colors are shifted sideways by one step.

The differences in optical path differences between the optical retarder layer or layers in the different regions can be achieved by varying the duration (illumination time) of light irradiation during polymerization or by varying the intensity of the polymerizing light.

In addition, as already mentioned, the wall orientation layers can be produced in a pattern with varying directions of orientation by sequential irradiation. This is also a means of varying the position of the nematic directors relative to the polarizers for each pixel. Widely varied color effects can be obtained in conjunction with the pixel specific optical properties of the retarder layer or layers.

As an alternative to FIG. 4, the optical retarder layers may be disposed between electrode layers and wall-orientation layers or on the outside of the glass plates.

Figure 6:
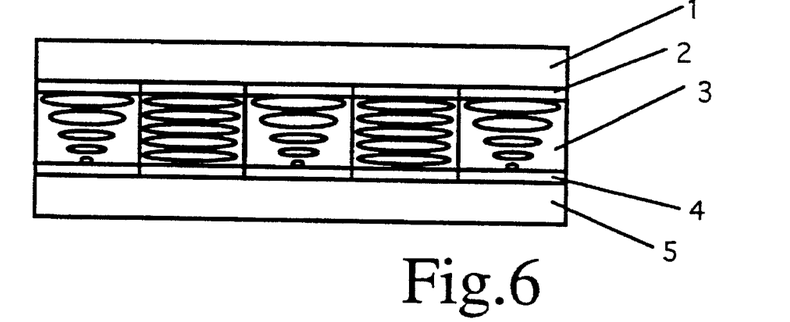
FIG. 6 is a section through a structured polarization rotator.

FIG. 6 shows a structured polarization rotator comprising two spaced-apart substrates 1 and 5, the facing surfaces of which are provided with structured PPN layers 2 and 4. In between there is a structured LC network layer 3 consisting of a pattern of TN and parallel cells.

Figure 7:
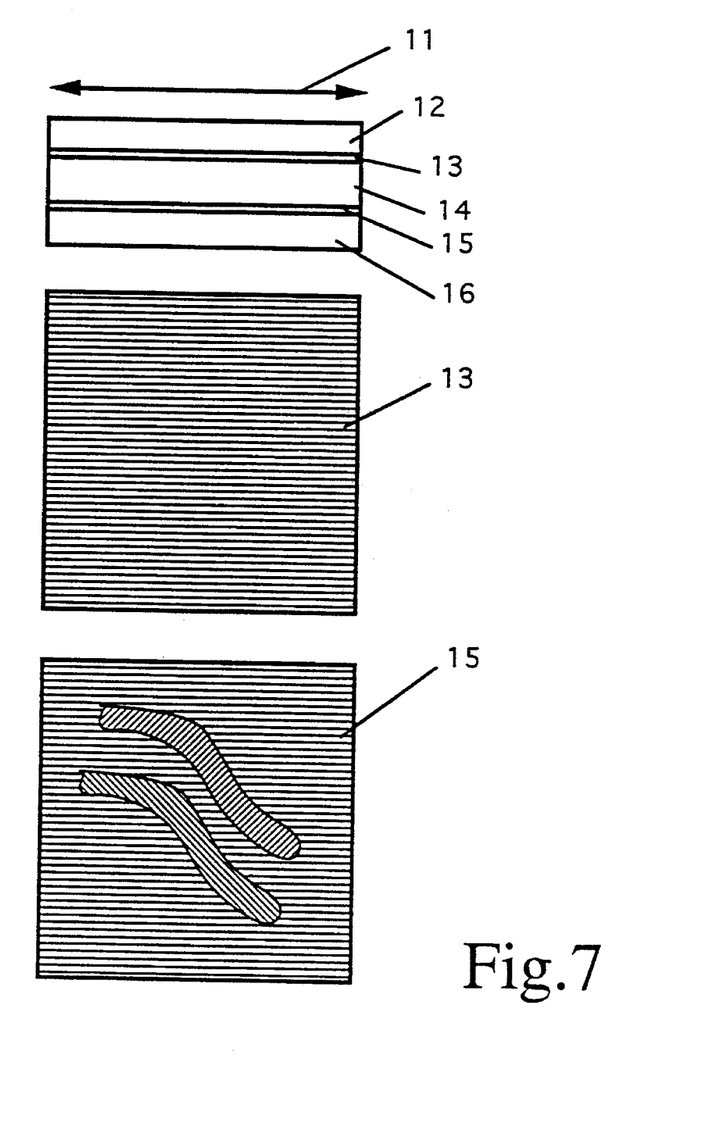
FIG. 7 is a diagram of a transparency for three-dimensional projection.

FIG. 7 is a diagram of a three-dimensional transparency comprising a linear polarizer 11 and a cell comprising two parallel substrates 12 and 16 with a uniformly oriented PPN layer (not shown) on one substrate 12 and a structured PPN layer on the other substrate 16. In between there is an LC network layer 14 oriented to correspond to the orientation layers 13 and 15.

The two plan views show the orientation directions of the orientation layer 13 on the input side and the orientation layer 15 on the output side.

Figure 8:
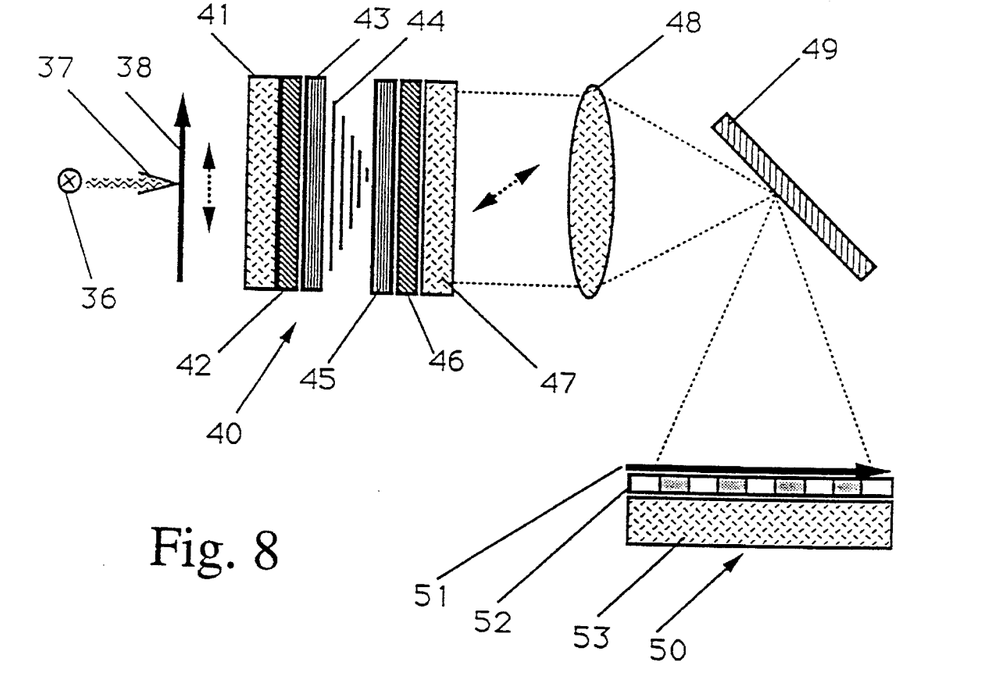
FIG. 8 is a diagram of a rear projection device for reproducing stereoscopic images.

FIG. 8 shows a rear stereo projection device containing a linear polarizer 38, polarizing the light parallel to the plane of the drawing, next to the light 37 coming from a source 36. The polarizer is followed by a TN-LCD 40 equipped with a number of actuatable pixels (for example, in the form of a matrix of square segments). Neighboring pixels contain the image information for the right and left eye respectively. In the switched-off state, light leaving the cell has a direction of polarization rotated through 90°. The light then reaches a focusing optical system 48 and a mirror 49. The mirror directs the light on to a projection screen 50 in the plane of the image. The screen comprises a linear polarizer 51 and a structured polarization rotating layer disposed on a diffuse transparent substrate. The structure is dimensioned so that the image of a pixel fills a structure element of the layer. Adjacent structure elements are in the form of TN and parallel cells respectively. In this manner the image information, for example, for the right eye, has polarization rotated through 90°, whereas the image information for the left eye remains polarized in the same state as before. The three-dimensional impression is visible through suitable polarization glasses.

Figure 9:
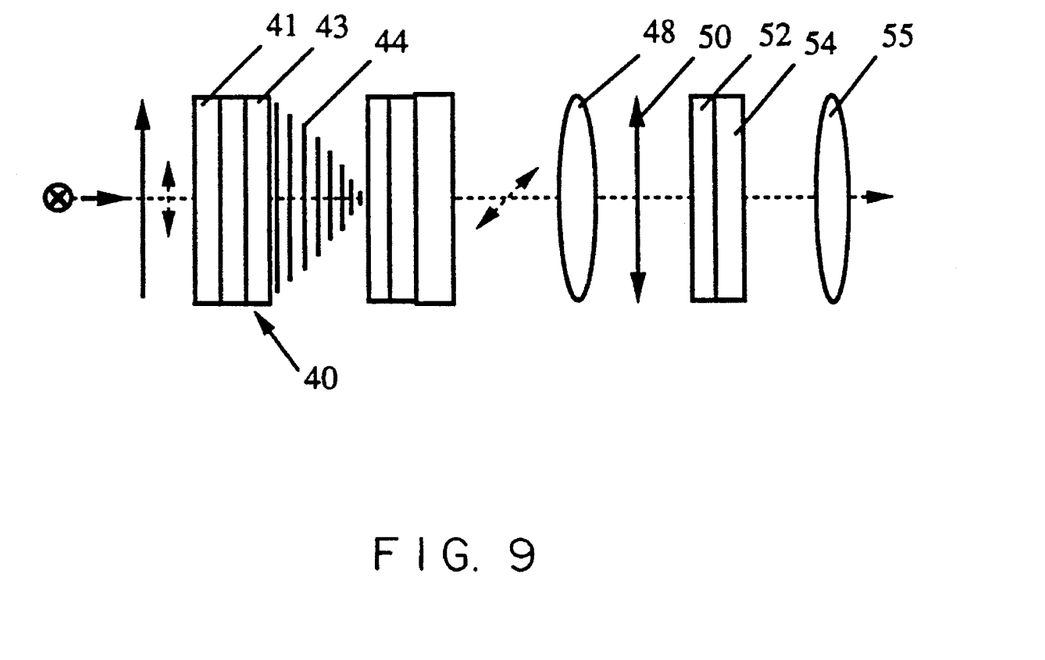
FIG. 9 is a diagram of a forward projection device for reproducing stereoscopic images.

FIG. 9 shows a stereo forward projection device which can be constructed in similar manner. In this case the structured polarization-rotating layer 52, which is in the plane of the first image, is disposed on a transparent substrate 54. A second optical system 55 projects this plane on to a polarization-retaining projection screen.

We claim:

1. An optical component comprising (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

2. The optical component according to claim 1, wherein the orientation layer has an orientation of the polymer molecules which differs in locally limited regions.

3. The optical component according to claim 2, wherein the direction of the optical axis of the anisotropic film varies with the orientation of the polymer molecules in the orientation layer.

4. A method of producing an optical component comprising (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film wherein the liquid crystal monomers are oriented by interaction with the PPN layer, said orientation fixed in a subsequent cross-linking step.

5. The method according to claim 4, wherein the cross-linking occurs by irradiation of said liquid crystal monomers with light.

6. The method according to claim 4, wherein the cross-linkable liquid crystal monomers are diacrylates and the materials in the orientation layer are cinnamate derivatives.

7. The method according to claim 4, wherein the cross-linking is carried out in a cell made up of two parallel, orientation layers.

8. The method according to claim 7, wherein one of the two orientation layers is removed after cross-linking.

9. The method according to claim 4, wherein a layer coated with PPN is selectively structured by repeated illumination with linear-polarized UV light having a varying direction of polarization, after which the cross-linkable liquid crystal material is oriented and cross-linked by spin-coating or immersion.

10. The method according to claim 4, wherein the cross-linkable liquid crystal material consists of mixtures of multi-functionalized liquid crystal monomers and functionalized dichroic chromophores.

11. The method according to claim 4, wherein the cross-linkable liquid crystal material consists of mixtures of multi-functionalized liquid crystal monomers and chiral molecules.

12. The method according to claim 4, wherein the cross-linkable liquid crystal material comprises mixtures of multi-functionalized liquid crystal monomers and functionalized liquid crystal monomers with an axial or lateral permanent dipole moment, such that these mixtures have positive or negative dielectric anisotropy.

13. The use of an optical component as a retarder layer, wherein said optical component comprises (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

14. The use of an optical component as a cholesteric filter, wherein said optical component comprises (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

15. The use of an optical component as a dichroic filter, wherein said optical component comprises (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

16. The use of an optical component as a dichroic polarizer, wherein said optical component comprises (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

17. The use of an optical component as a polarization rotator, wherein said optical component comprises (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

18. The use of an optical component as an image-carrier cell in which the image information is stored by variously oriented cell segments, wherein said optical component comprises (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

19. The use of an optical component in a three-dimensional projection system, wherein said optical component comprises (a) an anisotropic film of cross-linked liquid crystal monomers with varying local orientation of the liquid crystal molecules and (b) an orientation layer comprising a photo-orientable polymer network (PPN), said orientation layer being in contact with said anisotropic liquid crystal film.

* * * * *